3,085,048
METHOD OF PREPARING SUGAR-COATED
DICALCIUM PHOSPHATE PARTICLES
Freeman Bush, Philadelphia, Pa., assignor to The American Sugar Refining Company, New York, N.Y., a corporation of New Jersey
No Drawing. Filed Mar. 25, 1960, Ser. No. 17,458
1 Claim. (Cl. 167—93)

This invention relates to improvements in the coating of dicalcium phosphate with sucrose.

The coated dicalcium phosphate is a valuable anti-caries product or composition for use in chewing gum and for other purposes.

The calcium phosphates, such as dicalcium phosphate, $CaHPO_4$ and those precipiated phosphates having a calcium to phosphorus ratio in approximately this range, have been shown to have anti-caries activity in bread, baked goods, and the like. But when attempts are made to incorporate such materials directly into chewing gum, very little anti-caries activity is found. Nor is there any appreciable alteration of the calcium content of the saliva because the dicalcium phosphate is wet by and held within the gum base and is not extracted therefrom.

The present invention provides an improved process for coating dicalcium phosphate with sugar to produce a sugar-coated dicalcium phosphate which can advantageously be incorporated into the gum base of chewing gum so that it will be released gradually into the saliva when the gum is chewed.

The improved, sugar-coated dicalcium phosphate is a dry, powdered, crystalline product in which the powdered dicalcium phosphate is coated with approximately an equal weight of sugar.

The improved process of the present invention is one in which a hot sugar solution of regulated Brix and water content is admixed with powdered dicalcium phosphate to form a slurry and to effect coating of the dicalcium phosphate particles with the sugar solution. The admixture is carried out with agitation, and the agitation is continued while crystallization of the sugar occurs with self-drying of the product to form directly a homogeneous mixture of sugar and powdered dicalcium phosphate, with the sugar coating the dicalcium phosphate particles, and a product which is a dry powdered crystalline product.

The dicalcium phosphate used is in a finely divided form such that e.g. 100% passes a 325-mesh screen.

The hot sugar solution used is advantageously one of about 85° Brix and containing about 15% of water. Such a hot sugar solution can readily be obtained, e.g. by heating a more dilute sugar solution, such as a 70-Brix sugar solution, to around 115°–120° C. to form a super-saturated syrup of around 85–86% sucrose. The sugar syrup should have regulated sugar and water content, with sufficient water so that it will thoroughly wet the particles of dicalcium phosphate when admixed therewith and with an amount of water sufficiently small so that with continued agitation, the sugar will crystallize and the latent heat of crystallization will aid in drying the product so that a dry, powdered product is directly obtained.

If the concentration of the sugar solution is too high, it will interfere with the uniform wetting of the dicalcium phosphate particles and the forming of a slurry. If the sugar solution contains too much water, it will interfere with the direct production of a dry, powdered product. A hot sugar solution above 80° Brix and around 85° Brix is advantageously used.

It is not necessary to heat the dicalcium phosphate before admixing it with the hot sugar solution. The admixture of the dicalcium phosphate will cool the hot sugar solution somewhat, but effective stirring will nevertheless result in coating of the dicalcium phosphate particles with the sugar solution and the formation of a slurry. Continued stirring will result in crystallization of the sugar and the coating of the dicalcium phosphate with sugar crystals. During the stirring it has been observed that the temperature will at first drop and will then remain approximately constant for the period of time during which apparently the heat of crystallization equals the heat of evaporation of water from the syrup. Effective agitation during crystallization prevents the coated dicalcium phosphate particles from agglomerating to any appreciable extent while the heat of crystallization aids in removing moisture and in giving directly a dry, powdered product.

A ratio of sugar, in the sugar solution, equal to or approximately equal to the weight of the dicalcium phosphate, is advantageously used. This amount of sugar is sufficient to secure effective coating of the dicalcium phosphate particles. A sufficient amount of sugar solution should be used to effect this purpose, but any large excess of sugar solution is undesirable as reducing the ratio of dicalcium phosphate in the resulting product and as tending to cause agglomeration or excessive coating of the dicalcium phosphate particles.

The invention will be further illustrated by the following specific examples, but it will be understood that the invention is not limited thereto.

*Example 1.*—A sugar solution of 70° Brix is heated to 115° C. to form a super-saturated syrup of approximately 85% sucrose content. An amount of dicalcium phosphate powder equal to the weight of the sugar in the sugar solution is then added with agitation. The stirring of the sugar solution and added dicalcium phosphate results in forming a slurry and in coating the dicalcium phosphate particles with the syrup. Stirring is continued until the mixture is converted into a dry powder. As the crystallization of the sugar proceeds, the crystallization occurs around the dicalcium phosphate particles. Good agitation during crystallization prevents the coated particles from agglomerating to any considerable extent. The heat of crystallization aids in removing moisture and in giving a dry powdered product.

*Example 2.*—The sugar solution used and the proportions of sugar solution and dicalcium phosphate are the same as in Example 1. However, instead of adding the dicalcium phosphate to the sugar solution, the sugar solution is added to the dicalcium phosphate with agitation to form a slurry and coating of the dicalcium phosphate with the syrup, followed by continued agitation and crystallization to form a dry powdered product.

*Example 3.*—This example illustrates the carrying out of the method of Example 2 on a pilot plant scale.

10 pounds of sucrose are dissolved in preheated water in a 5-gallon steam jacketed kettle to make a 75% sugar solution, and this solution is heated to 115–120° C. to form a sugar solution of around 85–86% concentration.

10 pounds of powdered dicalcium phosphate are placed in a 2-gallon Kutmixer with double ribbon screw, which provides circular intermixing action, and the hot sugar syrup is then dumped onto the dicalcium phosphate in this mixer with continued agitation. The stirring continues for a total of about 20 minutes, at which time the mix is converted into a powder.

The products produced in accordance with the above examples are dry, powdered products which can be used directly without further grinding. A mesh analysis on one of the products showed 16.1% on a 100-mesh screen, 9.3% on a 200-mesh screen, 11% on a 270-mesh screen, and 63.6% through a 270-mesh screen.

The process is advantageously carried out without external cooling and with utilization of the heat of crystallization of the sugar to aid in driving off the moisture and to give a product in dry powdered form.

It is one advantage of the new powdered products that they can be used directly in chewing gum, or with further pulverizing of any small amounts of larger sized particles where desired. When the new powdered product is incorporated into slab gum or into the center of coated chewing gum, the chewing of the gum and the action of the saliva on the gum is such that prolonged chewing effects gradual working out of the particles of sugar-coated dicalcium phosphate from the gum. The sugar coating on the dicalcium phosphate particles is such as to result in working out of these particles from the center of the gum, so that they become effective as an antacid agent on the teeth. Thus, the sugar-coated dicalcium phosphate particles have the advantage of prolonged action in their extraction and effective anti-caries action on the teeth.

The improved anti-caries product can also be used for other purposes than in chewing gum. It can thus be converted into a tablet which, when chewed in the mouth, will release the dicalcium phosphate and exert its anti-caries action. The sugar-coated dicalcium phosphate powder can also be used for incorporation with other food products such as bread, baked goods and the like.

I claim:

The method of preparing sugar-coated dicalcium phosphate particles suitable for incorporation into chewing gum, comprising the steps of admixing a predetermined weight of dicalcium phosphate in fine particle form with about an equal weight of sugar in the form of an aqueous solution, in which said aqueous solution contains an amount of water, about 15%, such that the heat content of said solution and said predetermined weight of dicalcium phosphate at the time of the admixing aforesaid, plus the latent heat of crystallization of the sugar contained in said solution will be sufficient to evaporate the water present, so as to produce a substantially dry product, the admixture prepared as aforesaid being initially in the form of a slurry, and substantially continuously agitating the slurry thus formed during the conversion of the sugar in said aqueous solution from its liquid state to a crystalline state, so as to produce a substantially dry material consisting of the crystalline sugar-coated dicalcium phosphate particles in a flowable discrete particulate form without supplying heat from any external source to said slurry during the evaporation of water therefrom.

References Cited in the file of this patent

UNITED STATES PATENTS

| | | |
|---|---|---|
| 1,629,461 | Berg et al. | May 17, 1927 |
| 2,086,386 | Merrill | July 6, 1937 |
| 2,196,150 | Heald et al. | Apr. 2, 1940 |
| 3,011,949 | Bilotti | Dec. 5, 1961 |